(12) United States Patent
Li

(10) Patent No.: US 12,074,541 B2
(45) Date of Patent: *Aug. 27, 2024

(54) METHOD OF STARTING A SYNCHRONOUS MOTOR AND A CONTROLLER THEREFOR

(71) Applicant: KINETIC TECHNOLOGIES INTERNATIONAL HOLDINGS LP, Toronto (CA)

(72) Inventor: Kwei Chung Li, Kowloon (HK)

(73) Assignee: Kinetic Technologies International Holdings LP, Toronto (CA)

(*) Notice: Subject to any disclaimer, the term of this patent is extended or adjusted under 35 U.S.C. 154(b) by 0 days.

This patent is subject to a terminal disclaimer.

(21) Appl. No.: 18/236,066

(22) Filed: Aug. 21, 2023

(65) Prior Publication Data

US 2023/0396197 A1    Dec. 7, 2023

Related U.S. Application Data

(63) Continuation of application No. 17/462,805, filed on Aug. 31, 2021, now Pat. No. 11,817,804.

(51) Int. Cl.
*H02P 21/14* (2016.01)
*H02P 21/13* (2006.01)
*H02P 27/06* (2006.01)

(52) U.S. Cl.
CPC ............ *H02P 21/141* (2013.01); *H02P 21/13* (2013.01); *H02P 27/06* (2013.01)

(58) Field of Classification Search
CPC ...... H02P 2203/03; H02P 21/32; H02P 6/182; H02P 21/24; H02P 21/26; H02P 21/141; H02P 21/13; H02P 27/06
See application file for complete search history.

(56) References Cited

U.S. PATENT DOCUMENTS 10,291,160 B1    5/2019  Latham et al.
10,439,526 B2 *  10/2019  Tian .................... H02P 6/21
(Continued)

FOREIGN PATENT DOCUMENTS

CN    101984554 A    3/2011
CN    105703682 A    6/2016
(Continued)

OTHER PUBLICATIONS

PCT International Search Report and the Written Opinion mailed Oct. 10, 2022, issued in related International Application No. PCT/CN2022/106531 (9 pages).
(Continued)

*Primary Examiner* — Bickey Dhakal
(74) *Attorney, Agent, or Firm* — Sheppard Mullin Richter & Hampton LLP

(57) ABSTRACT

A method of switching from a closed-loop start-up method to a closed-loop synchronous operation motor control algorithm for a synchronous motor having a permanent magnet rotor and stator windings. The method comprises initiating the closed-loop start-up method by energizing the stator windings to drive the permanent magnet rotor using motor control signals based on a detected, estimated, or randomly selected initial standstill angle of the permanent magnet rotor. The method includes estimating rate of change values of rotor flux linkage magnitude with respect to a selected vector axis of a two-dimensional rotating orthogonal reference frame of the synchronous motor based on back-electromotive force (emf) induced in the stator windings by rotation of the permanent magnet rotor; and switching-over control of the synchronous motor to the closed-loop synchronous operation motor control algorithm upon determining that one of the rate of change values of the rotor flux linkage magnitude has met a predetermined condition.

20 Claims, 11 Drawing Sheets

(56) References Cited

U.S. PATENT DOCUMENTS

| | | |
|---|---|---|
| 10,819,264 B1 | 10/2020 | Bojoi et al. |
| 11,239,772 B1 | 2/2022 | Bojoi et al. |
| 2009/0128074 A1 | 5/2009 | Hu |
| 2009/0153083 A1 | 6/2009 | Rozman et al. |
| 2012/0091941 A1 | 4/2012 | Hong |
| 2020/0220486 A1 | 7/2020 | Chen et al. |
| 2021/0111647 A1 | 4/2021 | Kalygin et al. |
| 2021/0211079 A1 | 7/2021 | Jian et al. |

FOREIGN PATENT DOCUMENTS

| | | | |
|---|---|---|---|
| CN | 109372787 | A | 2/2019 |
| CN | 109639203 | A | 4/2019 |
| CN | 211830353 | A | 10/2020 |
| CN | 109039167 | A | 11/2020 |
| CN | 109951117 | A | 11/2020 |
| JP | 6693319 | B2 | 5/2020 |
| TW | 201425941 | A | 7/2014 |

OTHER PUBLICATIONS

Search Report dated Mar. 22, 2023, issued in related Taiwan Application No. 111130664 (3 pages).

Li Ying, A Starting Strategy for a Robust Position Sensorless Technique in Non-Salient PM AC Motor Drives, 2004, EEE, 1028-1032 (Year: 2004).

Jorge Zambada, "Sensorless Field Oriented Control of PMSM Motors", AN1078, Microchip Technology Inc., 2007.

"Sensorless PMSM Field-Oriented Control", DRM148, Freescale Conductor, Inc., 2016.

Wei Xu et al., "Improved Rotor Flux Observer for Sensorless Control of PMSM with Adaptive Harmonic Elimination and Phase Compensation", CES Transactions, vol. 3, Jun. 2019.

Non-Final Office Action dated Aug. 2, 2022, issued in related U.S. Appl. No. 17/462,805 (15 pages).

Non-Final Office Action dated Feb. 21, 2023, issued in related U.S. Appl. No. 17/462,805 (18 pages).

* cited by examiner

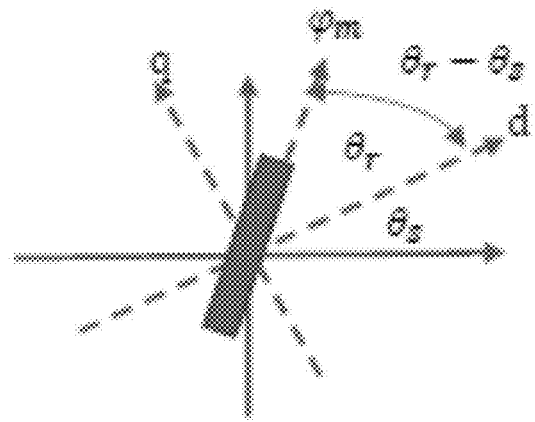
Fig. 16
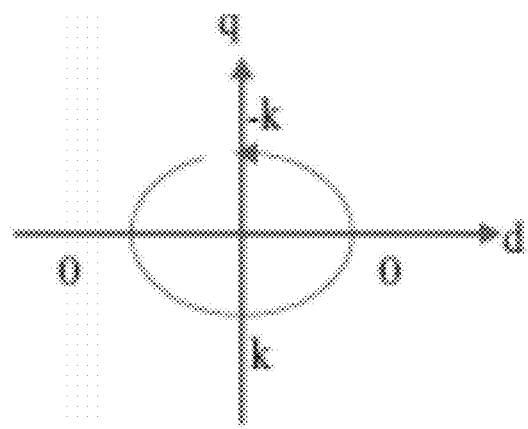
Fig. 17
| Quadrant | $\frac{d\varphi_{m}}{dt}$ | Operation |
|---|---|---|
| 1 | Decreasing | Keep $\theta_s$ |
| 2 | Increasing | $\theta_s = \theta_r$ |
| 3 | Increasing | $\theta_s = \theta_r$ |
| 4 | Decreasing | Keep $\theta_s$ |
Fig. 18

| Quadrant | dq/dt | Operation |
|---|---|---|
| 1 | Decreasing | Keep θ |
| 2 | Increasing | θ = new estimated angle |
| 3 | Increasing | θ = new estimated angle |
| 4 | Decreasing | Keep θ |

METHOD OF STARTING A SYNCHRONOUS MOTOR AND A CONTROLLER THEREFOR

CROSS REFERENCE TO RELATED APPLICATION

The present application is a continuation application of U.S. patent application Ser. No. 17/462,805, filed Aug. 31, 2021, entitled "Method of Starting a Synchronous Motor and a Controller Therefor," the disclosure of which is incorporated by reference herein in its entirety.

FIELD OF THE INVENTION

The invention relates to a method of starting a synchronous motor and a controller therefor. The method relates particularly, but not inclusively to a method of starting a permanent magnet synchronous motor (PMSM) having a sensorless closed-loop control system for synchronous operation.

BACKGROUND OF THE INVENTION

The most common types of multi-phase, e.g., three-phase, motors are synchronous motors and induction motors. When three-phase electric conductors are placed in certain geometrical positions, which means at a certain angle from one another, an electrical field is generated. The rotating magnetic field rotates at a certain speed known as the synchronous speed. If a permanent magnet or electromagnet is present in this rotating magnetic field, the magnet is magnetically locked with the rotating magnetic field and consequently rotates at the same speed as the rotating field which results in a synchronous motor, as the speed of the rotor of the motor is the same as the speed of the rotating magnetic field.

A permanent magnet motor uses permanent magnets in the rotor to provide a constant magnetic flux which has a sinusoidal back-electromotive force (emf) signal. The rotor locks in when the speed of the rotating magnetic field in the stator is at or near synchronous speed. The stator carries windings which are connected to a controller having a power stage including a voltage supply, typically an alternating current (AC) voltage supply, to produce the rotating magnetic field. Such an arrangement constitutes a PMSM.

PMSMs are similar to brushless direct current (BLDC) motors. BLDC motors can be considered as synchronous DC motors which use a controller having a power stage including a DC voltage supply, suitably converted, to produce the stator rotating magnetic field. BLDC motors therefore use the same or similar control algorithms as AC synchronous motors, especially PMSM motors.

Previously, it has been common in synchronous motor control systems to use at least one sensor, such as a Hall sensor, to detect the rotational position of the rotor during synchronous operation. However, sensorless motor control systems are now preferred.

Such sensorless motor control systems typically include a rotor position and speed estimation module where, during synchronous operation, rotor position and speed can be continuously estimated based on the back-emf induced by the rotating rotor. The estimated rotor positions and speeds are utilized to update and/or compensate the motor control signals during synchronous operation thereby providing sensorless closed-loop synchronous operation motor control.

A problem may, however, be encountered on start-up of the synchronous motor in that a minimum operating speed of the rotor is required to obtain a level of the estimated back-emf necessary for closed-loop motor control for synchronous operation. Consequently, an open-loop start-up method has been developed to address this problem. One such open-loop start-up method or procedure is described on page 19 of the publication entitled "Sensorless Field Oriented Control of PMSM Motors" authored by Jorge Zambada, published by Microchip Technology Inc. in 2007 as paper AN1078, the content of which is incorporated herein by way of reference. The open-loop start-up method involves energizing the stator windings to cause the rotor to commence rotating from its standstill position and to spin at a fixed acceleration rate. The open-loop start-up procedure provides a constant torque to start rotation and the fixed rate acceleration of the rotor.

Upon open-loop start-up, with the rotor initially at its standstill position, the sensorless motor control system is configured to generate a series of sinusoidal voltages to initiate the rotation and the fixed rate acceleration of the rotor. At the end of a start-up ramp, i.e., after a predetermined period of time, control of the motor is switched-over to the sensorless closed-loop synchronous operation motor control algorithm. If, at the time of switch-over, the rotor has reached a minimum operating speed such that the level of the back-emf induced by the rotor permanent magnets reaches or exceeds a threshold value, then synchronous operation of the motor should proceed without problems. The threshold value of the back-emf generated by the rotor permanent magnets is one where the back-emf is sufficient to enable the sensorless closed-loop synchronous operation motor control algorithm to provide accurate speed and position estimates for the rotor during synchronous operation of the motor.

FIG. 1 provides a graph of estimated rotor flux linkage magnitude, denoted as "flux magnitude" in the drawings, to motor (rotor) angle with respect to time illustrating the known open-loop start-up method and the switch-over at the end of the start-up ramp to the sensorless closed-loop synchronous operation motor control algorithm for synchronous operation of the motor. It can be seen in FIG. 1 that, during the start-up ramp period of the open-loop start-up procedure on the left-hand side of dashed line I-I on the horizontal time axis, the rotor is accelerated from standstill at a fixed acceleration rate towards the minimum operating speed where, in this instance, at the point in time of switch-over to the sensorless closed-loop synchronous operation motor control algorithm denoted by the dashed line I-I on the time axis, the estimated rotor flux linkage magnitude has reached or exceeded the threshold value. Consequently, control of the motor successfully transitions to the closed-loop control for synchronous operation of the motor. It will be understood that the estimated rotor flux linkage magnitude during the start-up ramp period is estimated and may differ significantly from actual rotor flux linkage magnitude.

It will be seen that the estimated rotor flux linkage magnitude varies sinusoidally during successful synchronous operation of the motor. The magnetic flux of the rotor permanent magnets is constant, but the estimated rotor flux linkage magnitude varies in time with respect to the constant magnetic flux of the rotor permanent magnets.

In the open-loop start-up procedure, the generation of the series of sinusoidal voltages to initiate rotation and then acceleration of the rotor must be based on an initial standstill rotor position. In a sensorless motor control system, there are normally no means to detect the initial standstill rotor position. Furthermore, unless the sensorless motor control system is modified to include some means to somehow detect or estimate the initial standstill rotor position, then it must rely on a guessed or randomly selected initial standstill rotor position.

There are problems with the open-loop start-up procedure.

One of these problems is illustrated by FIG. 2 which also provides a graph of estimated rotor flux linkage magnitude to motor (rotor) angle with respect to time illustrating the open-loop start-up method and the switch-over to the sensorless closed-loop synchronous operation motor control algorithm, but with a varying motor load condition. A varying load condition can slow or, in some cases, even reverse the rotation direction of the rotor. As seen in FIG. 2, whilst the open-loop start-up procedure seeks to accelerate rotation of the rotor towards the minimum operating speed for synchronous operation, at the end of the start-up ramp period, denoted by the dashed line I-I on the time axis, where control of the motor transitions from the open-loop start-up procedure to the sensorless closed-loop synchronous operation motor control algorithm, the level of the back-emf induced by the rotor permanent magnets has not reached or exceeded the threshold value for synchronous operation. This may be caused by a sudden increase in load on the motor at or about the time of the transition between the open-loop start-up procedure and the closed-loop synchronous operation of the motor. For example, this may comprise a gust of wind slowing or even reversing rotation of a fan impeller of a motor driven fan. Consequently, at the transition where the closed-loop motor control for synchronous operation takes over, the back-emf is or becomes insufficient for closed-loop synchronous operation of the motor and the closed-loop motor control algorithm must subsequently allow the motor to stop, i.e., to cease driving the rotor and allow the rotor to stop rotating and come to a standstill again. The rotor must be at a standstill again before the open-loop start-up procedure can once again be attempted. It will be appreciated that it can take a considerable period of time in the order of several seconds for the rotor to come to a standstill position again.

Among other things, what is therefore desired is an improved method of starting a synchronous motor.

OBJECTS OF THE INVENTION

An object of the invention is to mitigate or obviate to some degree one or more problems associated with known methods of starting a synchronous motor.

The above object is met by the combination of features of the main claims; the sub-claims disclose further advantageous embodiments of the invention.

Another object of the invention is to provide an improved method of starting a PMSM having a sensorless closed-loop control system for synchronous operation.

Another object of the invention is to provide an improved method of starting a synchronous motor having a sensorless closed-loop control system for synchronous operation which can estimate, determine, or detect, during start-up, any of the conditions that the rotor is rotating, the rotor is rotating in a correct direction, and/or a speed of rotation of the rotor.

One skilled in the art will derive from the following description other objects of the invention. Therefore, the foregoing statements of object are not exhaustive and serve merely to illustrate some of the many objects of the present invention.

SUMMARY OF THE INVENTION

In a first main aspect, the invention provides a closed-loop start-up method to a closed-loop synchronous operation motor control algorithm for a synchronous motor having a permanent magnet rotor and stator windings, the method comprising the steps of: initiating the closed-loop start-up method by energizing the stator windings to drive the permanent magnet rotor using motor control signals based on a detected, estimated, or randomly selected initial standstill angle of the permanent magnet rotor; estimating rate of change values of rotor flux linkage magnitude with respect to a selected vector axis of a two-dimensional rotating orthogonal reference frame of the synchronous motor based on back-electromotive force (emf) induced in the stator windings by rotation of the permanent magnet rotor; and switching-over control of the synchronous motor to the closed-loop synchronous operation motor control algorithm upon determining that one of the rate of change values of the rotor flux linkage magnitude has met a predetermined condition.

In a second main aspect, the invention provides a closed-loop controller for a synchronous motor having a permanent magnet rotor and stator windings, the closed-loop controller comprising a non-transitory computer-readable medium storing machine-readable instructions and a processor, wherein, when the machine-readable instructions are executed by the processor, the machine-readable instructions cause the controller to start the synchronous motor in accordance with the method of the first main aspect of the invention.

In a third main aspect, the invention provides closed-loop method of starting a synchronous motor having a permanent magnet rotor and stator windings, the method comprising: driving the permanent magnet rotor by energizing the stator windings using motor control signals based on a detected, estimated, or randomly selected initial standstill angle of the permanent magnet rotor; estimating rate of change values of rotor flux linkage magnitude with respect to a selected vector axis of a two-dimensional rotating orthogonal reference frame of the synchronous motor based on back-electromotive force (emf) induced in the stator windings by rotation of the permanent magnet rotor; using the rate of change values of rotor flux linkage magnitude to estimate respective new rotor angles to generate updated motor control signals; driving the permanent magnet rotor using the updated motor control signals; and determining from the respective new rotor angles whether the permanent magnet rotor is rotating or whether the permanent magnet rotor is rotating in a correct direction of rotation.

The summary of the invention does not necessarily disclose all the features essential for defining the invention; the invention may reside in a sub-combination of the disclosed features.

The forgoing has outlined fairly broadly the features of the present invention in order that the detailed description of the invention which follows may be better understood. Additional features and advantages of the invention will be described hereinafter which form the subject of the claims of the invention. It will be appreciated by those skilled in the art that the conception and specific embodiment disclosed may be readily utilized as a basis for modifying or designing other structures for carrying out the same purposes of the invention.

BRIEF DESCRIPTION OF THE DRAWINGS

The foregoing and further features of the present invention will be apparent from the following description of preferred embodiments which are provided by way of example only in connection with the accompanying figures, of which:

FIG. 16 illustrates rotation of the rotor with respect to vector axes q and d in the closed-loop start-up method in accordance with the invention;

FIG. 17 illustrates clockwise (correct) direction of rotor rotation with respect to vector axes q and d in the closed-loop start-up method in accordance with the invention;

FIG. 18 illustrates the periodic changes in rotor angle and stator angle in the closed-loop start-up method in accordance with the invention for the clockwise direction of rotor rotation;

DESCRIPTION OF PREFERRED EMBODIMENTS

Figure 1:
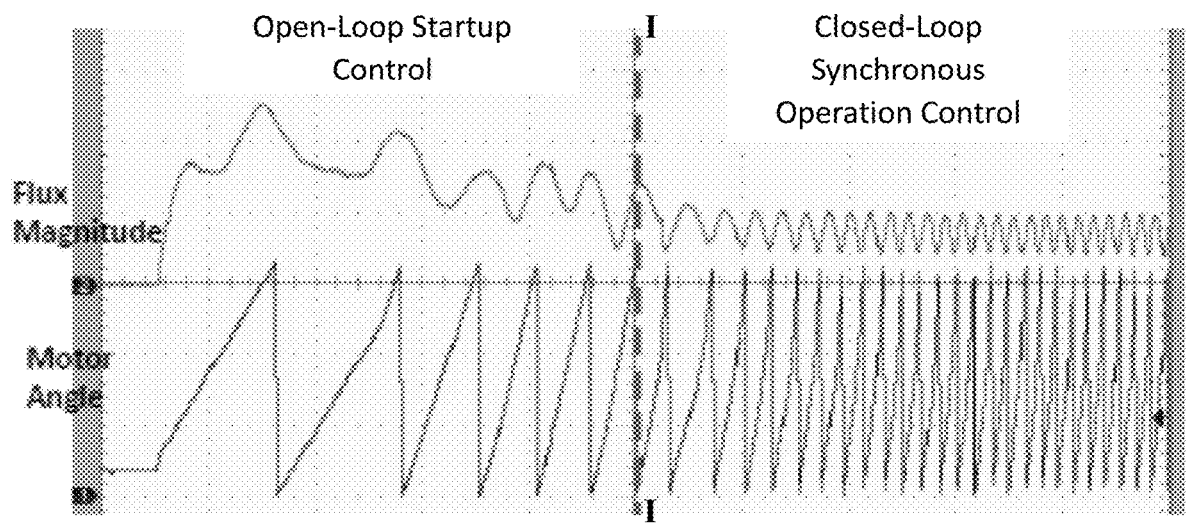
FIG. 1 is a graph of estimated rotor flux linkage magnitude to motor (rotor) angle with respect to time illustrating a known open-loop start-up method for a synchronous motor.
Figure 2:
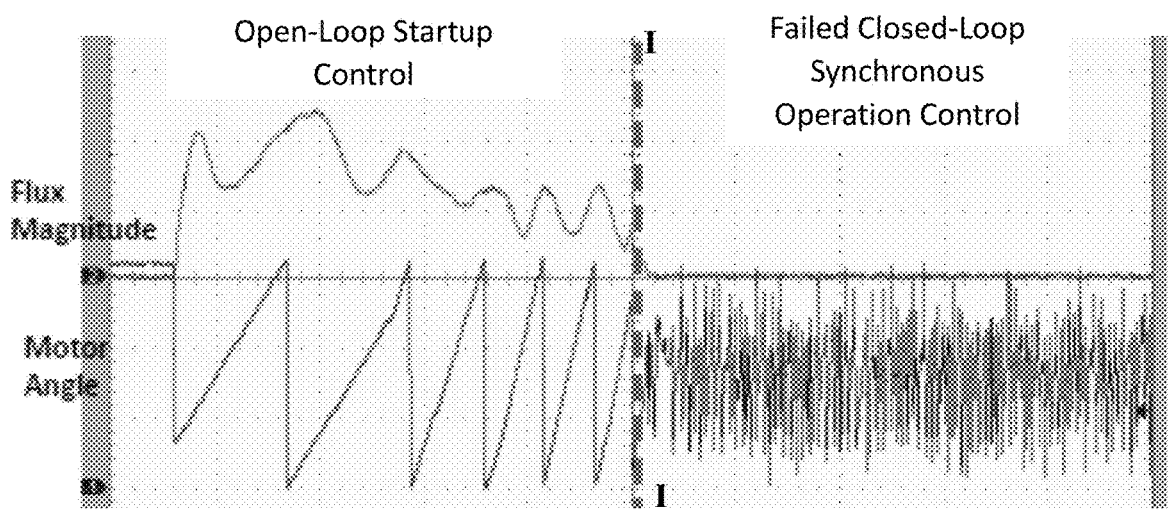
FIG. 2 is a graph illustrating the known open-loop start-up method where the synchronous motor has a motor load that varies with time.

The following description is of preferred embodiments by way of example only and without limitation to the combination of features necessary for carrying the invention into effect.

Reference in this specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments, but not other embodiments.

It should be understood that the elements shown in the Figs. may be implemented in various forms of hardware, software, or combinations thereof. These elements may be implemented in a combination of hardware and software on one or more appropriately programmed general-purpose devices, which may include a processor, a memory and input/output interfaces.

The present description illustrates the principles of the present invention. It will thus be appreciated that those skilled in the art will be able to devise various arrangements that, although not explicitly described or shown herein, embody the principles of the invention and are included within its spirit and scope.

Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of systems and devices embodying the principles of the invention.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor ("DSP") hardware, read-only memory ("ROM") for storing software, random access memory ("RAM"), and non-volatile storage.

In the claims hereof, any element expressed as a means for performing a specified function is intended to encompass any way of performing that function including, for example, a) a combination of circuit elements that performs that function or b) software in any form, including, therefore, firmware, microcode, or the like, combined with appropriate circuitry for executing that software to perform the function. The invention as defined by such claims resides in the fact that the functionalities provided by the various recited means are combined and brought together in the manner which the claims call for. It is thus regarded that any means that can provide those functionalities are equivalent to those shown herein.

The invention relates particularly to a method of and controller for starting a PMSM having a sensorless closed-loop controller for synchronous operation, but the method is applicable to any synchronous motor with a closed-loop controller for synchronous operation which utilizes rotor induced back-emf to obtain estimates of at least the rotor position and preferably also the rotor speed to provide one or more closed-loop control parameters for synchronous operation. It is only necessary that the sensorless closed-loop controller has means or is provided with means to measure or make estimates of the rotor flux linkage magnitude and/or angle, i.e., to measure or make estimates of the back-emf induced by the rotating rotor in one or more of the stator windings.

One advantage of the invention is that it can be implemented on an existing closed-loop controller for synchronous operation without significant modification save for changes in the controller's control algorithm or algorithms. The closed-loop control algorithm in accordance with the invention can be implemented by software, firmware, hardware, or any combination of the foregoing. It may be embodied as an application specific integrated circuit or chip.

References herein to "rotor angle" are to be taken as references to "rotor position". References herein to "stator angle" are to be taken as references to "commutation angle".

Figure 3:
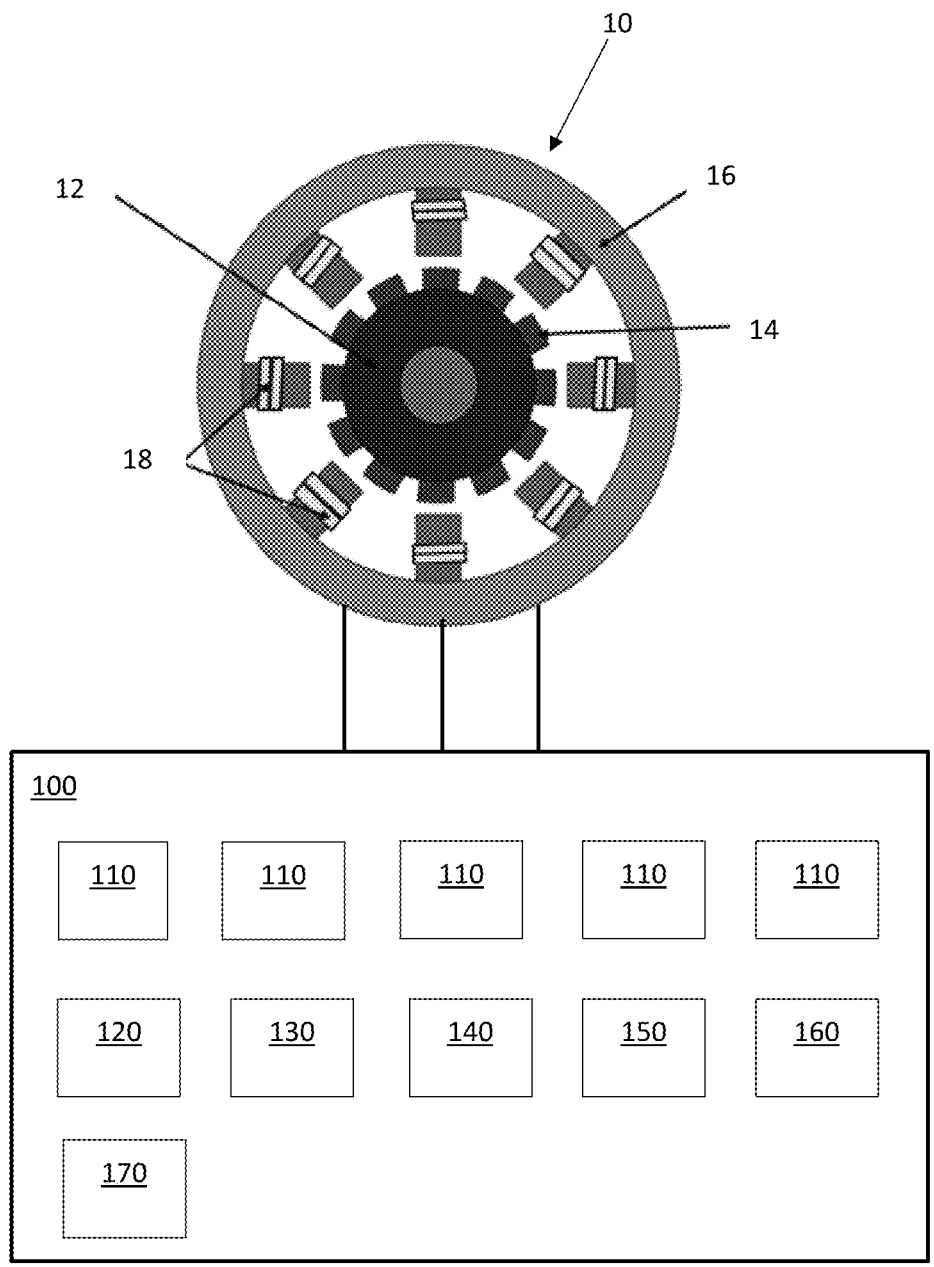
FIG. 3 is a block schematic diagram illustrating a synchronous motor with a closed-loop controller in accordance with the invention.

FIG. 3 shows an exemplary embodiment of an improved closed-loop controller 100 for a synchronous motor 10 in accordance with concepts of the present invention. The synchronous motor 10 has a permanent magnet rotor 12 with a plurality of permanent magnets 14 and a stator 16 with a plurality of stator windings 18. Whilst the synchronous motor 10 is shown with the stator 16 surrounding the rotor 12 in a conventional manner, it will be understood that the concepts of the present invention are equally applicable to a synchronous motor where the rotor surrounds the stator, i.e., the stator is arranged internally of the rotor.

In the illustrated embodiment, the closed-loop controller 100 may comprise a plurality of functional blocks 110 for performing various functions thereof. For example, the closed-loop controller 100 may comprise a suitably modified or suitably configured known vector-based closed-loop controller such as a direct torque control (DTC) closed-loop controller or a Field Oriented Control (FOC) closed-loop controller as described, for example, in "Sensorless Field Oriented Control of PMSM Motors" of paper AN1078 and as illustrated in FIG. 4 herein but modified as described below in accordance with the concepts of the invention.

The closed-loop controller 100 may, for example, be implemented using logic circuits and/or executable code/machine readable instructions stored in a memory for execution by a processor 120 to thereby perform functions as described herein. For example, the executable code/machine readable instructions may be stored in one or more memories 130 (e.g., random access memory (RAM), read only memory (ROM), flash memory, magnetic memory, optical memory, or the like) suitable for storing one or more instruction sets (e.g., application software, firmware, operating system, applets, and/or the like), data (e.g., configuration parameters, operating parameters and/or thresholds, collected data, processed data, and/or the like), etc. The one or more memories 130 may comprise processor-readable memories for use with respect to one or more processors 120 operable to execute code segments of the closed-loop controller 100 and/or utilize data provided thereby to perform functions of the closed-loop controller 100 as described herein. Additionally, or alternatively, the closed-loop controller 100 may comprise one or more special purpose processors (e.g., application specific integrated circuit (ASIC), field programmable gate array (FPGA), graphics processing unit (GPU), and/or the like configured to perform functions of the closed-loop controller 100 as described herein.

Figure 4:
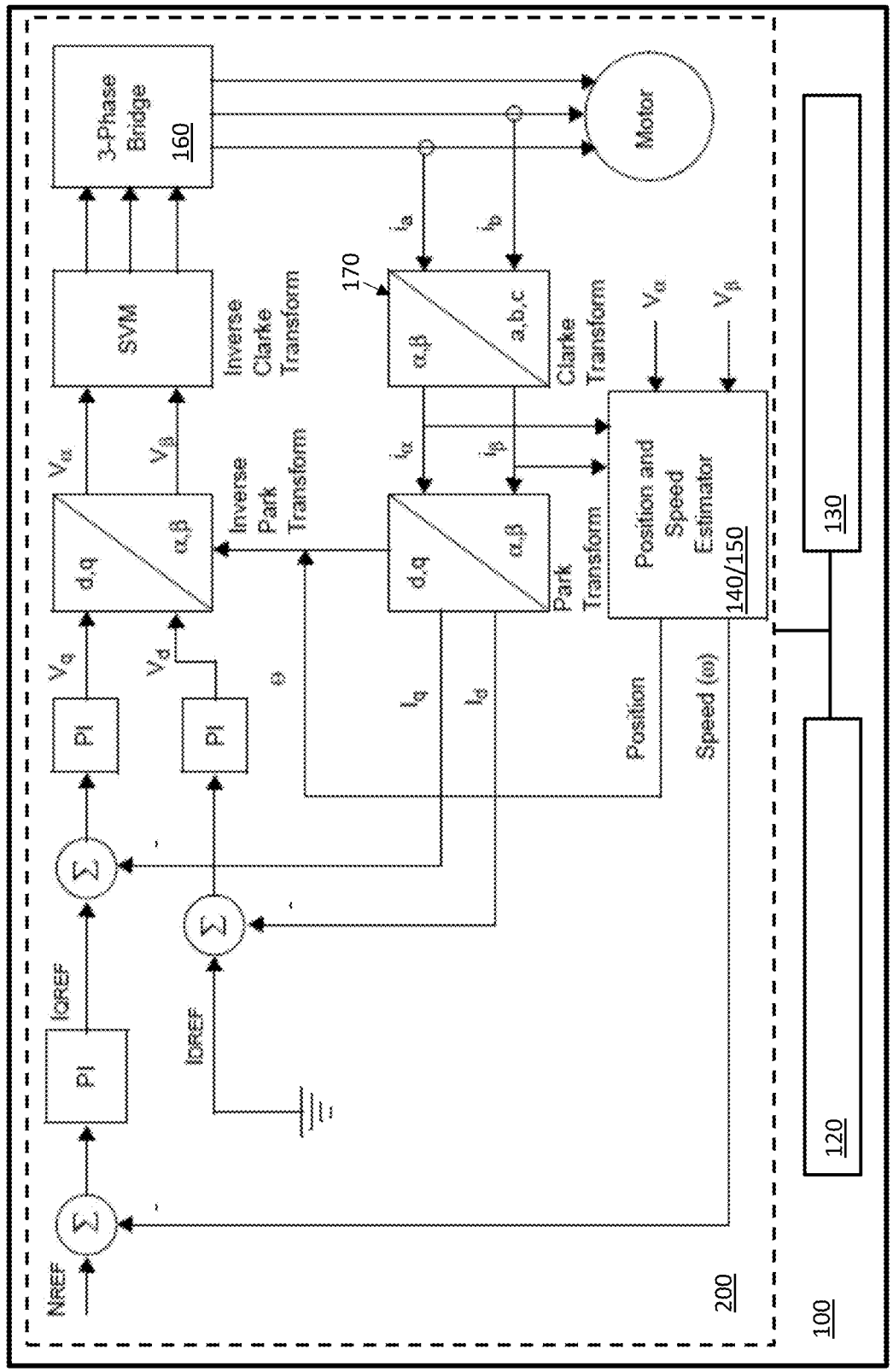
FIG. 4 is a detailed block schematic diagram of an embodiment of the closed-loop controller in accordance with the invention.

In a broad aspect, the invention comprises using the closed-loop controller 100 of FIGS. 3 and 4, e.g., using the modified FOC controller 200 of FIG. 4, to implement the closed-loop start-up procedure in accordance with the invention to cause the rotor 12 to commence rotation and accelerate towards its minimum rotor speed for switching-over to the closed-loop motor control for synchronous operation in response to one or more conditions being satisfied. The closed-loop controller 100 may, as mentioned above, comprise any known, suitable closed-loop controller for synchronous operation and may comprise the FOC controller 200 as described in "Sensorless Field Oriented Control of PMSM Motors" of paper AN1078 or as described in the publication entitled "Sensorless PMSM Field-Oriented Control", the FOC controller 200 being suitably modified or reconfigured to implement the closed-loop start-up method of the invention in addition to the closed-loop synchronous operation control algorithm.

The present invention seeks to preferably replace or optionally supplement the known open-loop start-up method for a synchronous motor, especially a PMSM, by a closed-loop start-up procedure as will be hereinafter described and as illustrated with reference to FIGS. 5 to 8.

The modified or reconfigured closed-loop controller 100/200 of FIGS. 3 and 4 is arranged to start the synchronous motor 10 having a permanent magnet rotor 12 and stator windings 18 by energizing the stator windings 18 using motor control signals based on or derived from a detected, estimated or randomly selected rotor angle to thereby cause rotation of the rotor 12 from its initial standstill position. This initial step is common with a first step of the known open-loop start-up method.

Whilst existing known sensorless closed-loop controllers normally do not have means for detecting an initial position of the rotor 12 on start-up, the closed-loop controller 100/200 of the present invention is intended to be utilized with applicant's other innovations including methods for detecting or at least estimating the initial standstill position of the rotor 12 on start-up.

In one embodiment, however, the initial standstill rotor angle on initiation of the closed-loop start-up method comprises a predetermined parked rotor angle. The predetermined parked rotor angle may be obtained when stopping the motor 10 after a preceding synchronous operation of the motor 10. The predetermined parked rotor angle may be obtained after switching-over control of the motor 10 to the closed-loop synchronous operation motor control algorithm where, when the motor is stopped, the closed-loop controller 100/200 is configured to park the rotor 12 at a predetermined rotor angle. The predetermined rotor angle can be stored in the memory 130 and recalled when needed on initiation of start-up of the motor 10.

The closed-loop start-up method or procedure includes periodically estimating values of rotor flux linkage magnitude and/or angle based on the back-emf induced in the stator windings 18 by the rotating rotor 12. Preferably, this includes estimating respective new rotor angles for respective periodic time points or intervals during the start-up method to generate updated motor control signals to drive the rotor 12. It may also include estimating respective rotor speeds for said periodic time points or intervals. The step of periodically estimating values of rotor flux linkage magnitude and/or angle may comprise periodically estimating the values of the rotor flux linkage magnitude and/or angle based on estimated values of the back-emf induced in the stator windings 18 by the rotating rotor 12. It may also comprise periodically estimating the values of the rotor flux linkage magnitude with respect to a selected vector axis of the synchronous motor 10. Preferably, the d-axis is selected. Furthermore, it may comprise estimating a rate of change of the estimated values of rotor flux linkage magnitude.

Initially, the speed of rotation of the rotor 12 is slow and hence the back-emf induced by the rotor 12 is also small such that some of the estimated rotor angles provided by a module 140 of the closed-loop motor controller 100/200 may differ considerably from the actual rotor angles due to the presence of noise in the estimated back-emf value of the slowly moving rotor 12.

In some embodiments, the module 140 may comprise a rotor position and speed estimation module 140 of the modified FOC controller 200 of FIG. 4.

In some embodiments, the module 140 may comprise a rotor flux observer module 150 of a type as described in pages 1-3 of the publication entitled "Improved Rotor Flux Observer For Sensorless Control of PMSM With Adaptive Harmonic Elimination and Phase Compensation" authored by Wei Xu et al, CES Transactions On Electrical Machines and Systems, vol. 3, no. 2, June 2019, the content of which is herein incorporated by reference.

As the speed of the rotor 12 increases based on the updated motor control signals, the periodic estimated values of the rotor flux linkage magnitude and/or angle are expected to provide more accurate estimates of the respective new rotor angles leading to more accurate rotation and acceleration of the rotor 12.

In one embodiment of the invention, the closed-loop controller 100/200 is configured to determine from said estimated respective new rotor angles whether or not the rotor 12 is rotating and/or whether or not the rotor 12 is rotating in a correct direction of rotation. If it is determined that the rotor 12 is rotating in a wrong direction, the closed-loop controller 100 may be configured to correct the direction of rotation of the rotor 12.

The determination may also include determining from said estimated respective new rotor angles whether or not the rotor speed is at or above a minimum operating speed for synchronous operation of the motor 10.

In another embodiment of the invention, the closed-loop controller 100/200 is configured to switch-over control of the motor 10 to the closed-loop synchronous operation motor control algorithm embodied in the closed-loop controller 100/200 in response to any one or any combination of the following conditions: (i) at or after a selected, calculated or predetermined period of time from initiation of the closed-loop start-up method; (ii) upon determination that the rotor 12 has reached a minimum operating speed; (iii) upon determination that the estimated value of rotor flux linkage magnitude reaches or exceeds a predetermined, selected or calculated threshold value.

The threshold value of the rotor flux linkage magnitude derived from the back-emf induced by the rotor permanent magnets 14 is one where the back-emf is sufficiently strong as to enable the sensorless closed-loop controller 100/200 for the motor 10 to provide sufficiently accurate rotor position estimates and preferably also rotor speeds to enable synchronous operation of the motor 10.

In some embodiments, the threshold value can be considered as comprising a switch-over threshold value in that, once the closed-loop controller 100/200 during the closed-loop start-up procedure determines that the estimated rotor flux linkage magnitude has reached or exceeded the threshold value and/or that the rotor speed has reached or exceeded the minimum operating speed, the closed-loop controller 100/200 then immediately switches control of the motor 10 from the closed-loop start-up method to the closed-loop synchronous operation control algorithm. In these embodiments, the switch-over from the closed-loop start-up procedure to the closed-loop synchronous operation control algorithm may, however, be subject to a predetermined time period from initiation of the closed-loop start-up method insofar that the switch-over cannot be implemented until expiry of said predetermined time period.

In other embodiments, the closed-loop controller 100/200 is configured to switch-over control of the motor 10 from the closed-loop start-up method to the closed-loop synchronous operation control algorithm at the end of the predetermined time period from initiation of the closed-loop start-up method.

An advantage of configuring the closed-loop controller 100/200 to switch-over control of the motor 10 from the closed-loop start-up method to the closed-loop synchronous operation control algorithm at the end of a predetermined time period from initiation of the closed-loop start-up method is that it terminates the closed-loop start-up method after said predetermined period of time.

Another advantage of configuring the closed-loop controller 100/200 to switch-over control of the motor 10 from the closed-loop start-up method to the closed-loop synchronous operation control algorithm once it has determined that the estimated rotor flux linkage magnitude has reached or exceeded the threshold value and/or that the rotor speed has reached or exceeded the minimum operating speed is that this is expected to result in a more successful transition to closed-loop synchronous operation control than the alternatives.

The closed-loop controller 100/200 may be configured such that if, after switching-over control of the motor 10 to the closed-loop synchronous operation motor control algorithm, it is determined that the motor 10 is not operating synchronously, closed-loop controller 100/200 repeats the closed-loop start up method to again try to successfully transition from the closed-loop start-up method to the closed-loop synchronous operation motor control algorithm.

An advantage of the closed-loop start-up method of the invention is that it is not necessary to bring the rotor 12 to a standstill position prior to repeating the closed-loop start-up method.

The closed-loop controller 100/200 may be configured such that it can determine that the motor 10 is not operating synchronously when an estimated value of the rotor flux linkage magnitude at or just after a time of switching-over to the closed-loop synchronous operation motor control algorithm is determined to be below the switch-over threshold value and/or it is determined that the speed of the rotor 12 is below the minimum operating speed for synchronous operation of the motor 10.

In some embodiments, the closed-loop controller 100/200 may be configured such that it can determine that the motor 10 is not operating synchronously when an estimated value of the rotor flux linkage magnitude at or just after a time of switching-over to the closed-loop synchronous operation motor control algorithm is determined to be outside a predetermined, selected, or calculated range of values. The range of values may comprise a range which includes within it the value of the constant flux magnitude of the rotor 12. The constant flux magnitude of the rotor 12 may comprise a midpoint of this range. The upper and lower limits of the range may be plus or minus 10% of the value of the constant flux magnitude of the rotor 12.

In some embodiments, the closed-loop controller 100/200 may be configured to initiate start-up of the motor 10 using the open-loop start up procedure to initiate rotation of the rotor 12 from its initial standstill position and, once the rotor 12 is rotating, implement the closed-loop start-up method according to the invention.

This has the advantage that it reduces the chances of the rotor 12 rotating in a wrong direction immediately at start-up.

Referring to FIGS. 5-8, FIG. 5 provides a graph of estimated rotor flux linkage magnitude to motor (rotor) angle with respect to time illustrating one embodiment of the closed-loop start-up method in accordance with the invention.

Figure 5:
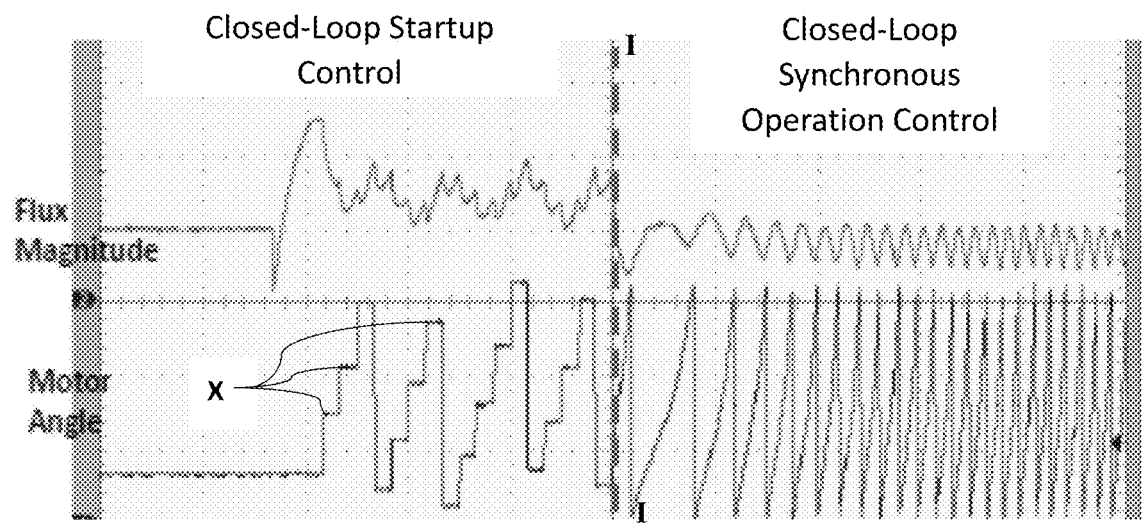
FIG. 5 is a graph of estimated rotor flux linkage magnitude to motor (rotor) angle with respect to time illustrating a closed-loop start-up method for a synchronous motor in accordance with the invention.

In considering FIG. 5, it should be borne in mind that the graph of the rotor flux linkage magnitude, denoted as "flux magnitude" in the drawing, comprises estimated values of the rotor flux linkage magnitude. Similarly, the graph of the rotor angle, denoted as "motor angle" in the drawing, comprises estimates of the rotor angle with time. Consequently, it will be understood that the estimated values of both the rotor flux linkage magnitude and the rotor angle may vary considerably from the real values during the closed-loop start-up procedure.

The steps "X" in the rotor angle graph for the closed-loop start-up procedure are indicative of the successive points in time or successive time intervals at which estimated respective new rotor angles are determined which are used to generate the updated motor control signals to drive the rotor 12 during the closed-loop start-up procedure.

The vertical dashed line I-I on the time axis is indicative of the end of the predetermined period of the closed-loop start-up procedure at which point control of the motor 10 transitions, in this instance, successfully to the closed-loop synchronous operation motor control algorithm.

Figure 6:
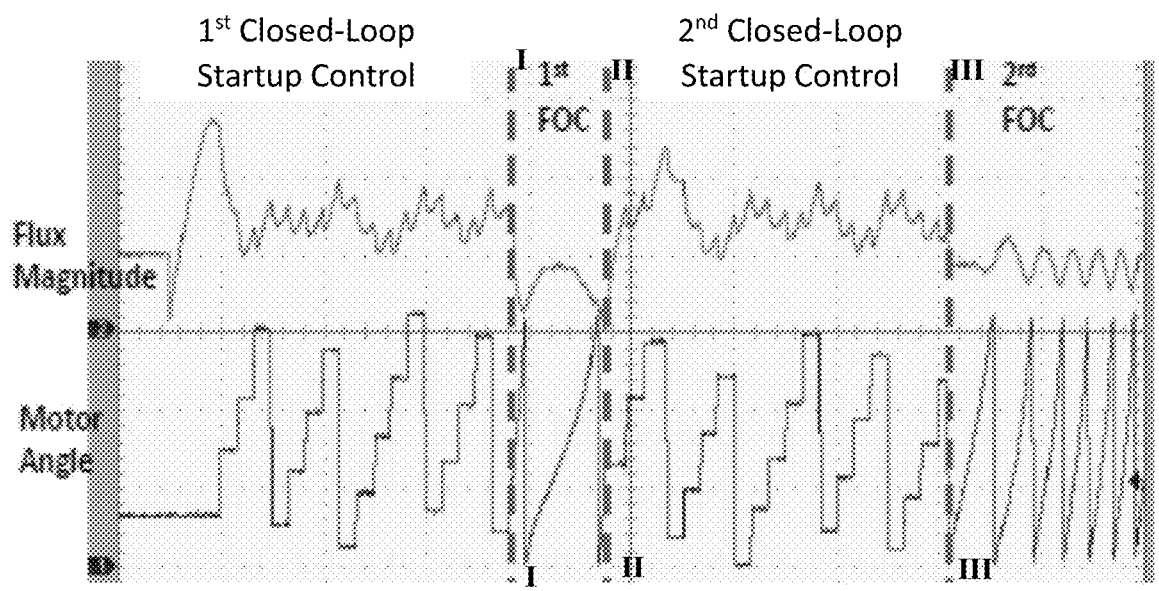
FIG. 6 is a graph illustrating the closed-loop start-up method in accordance with the invention where a first attempt at closed-loop start-up fails.

In contrast to FIG. 5, FIG. 6 provides a graph illustrating the closed-loop start-up method in accordance with the invention where a first attempt to transition from the closed-loop start-up procedure to the closed-loop synchronous operation motor control algorithm fails.

The first dashed line I-I on the time axis is indicative of the end of the predetermined period of a first implementation of the closed-loop start-up procedure at which point control of the motor 10 transitions, in this instance, unsuccessfully to the closed-loop synchronous operation motor control algorithm, denoted as "$1^{st}$ FOC" in the drawing. The failure to transition successfully may be due to the estimated value of the rotor flux linkage magnitude being below the threshold value for synchronous operation of the motor 10. Within a short period of time, the closed-loop controller 100/200 determines that the motor 10 is not operating synchronously. In response, the closed-loop controller 100/200 terminates the first implementation of the closed-loop synchronous operation motor control algorithm and, at the second dashed line II-II on the time axis, initiates a second implementation of the closed-loop start-up procedure. The third dashed line III-III on the time axis is indicative of a transition, in this instance, successfully to a second implementation of the closed-loop synchronous operation motor control algorithm, denoted as "$2^{nd}$ FOC" in the drawing. It will be noted that there is no requirement to bring the rotor 12 to a standstill when initiating the second implementation of the closed-loop start-up procedure after a failed transition to the first implementation of the closed-loop synchronous operation motor control algorithm.

Figure 7:
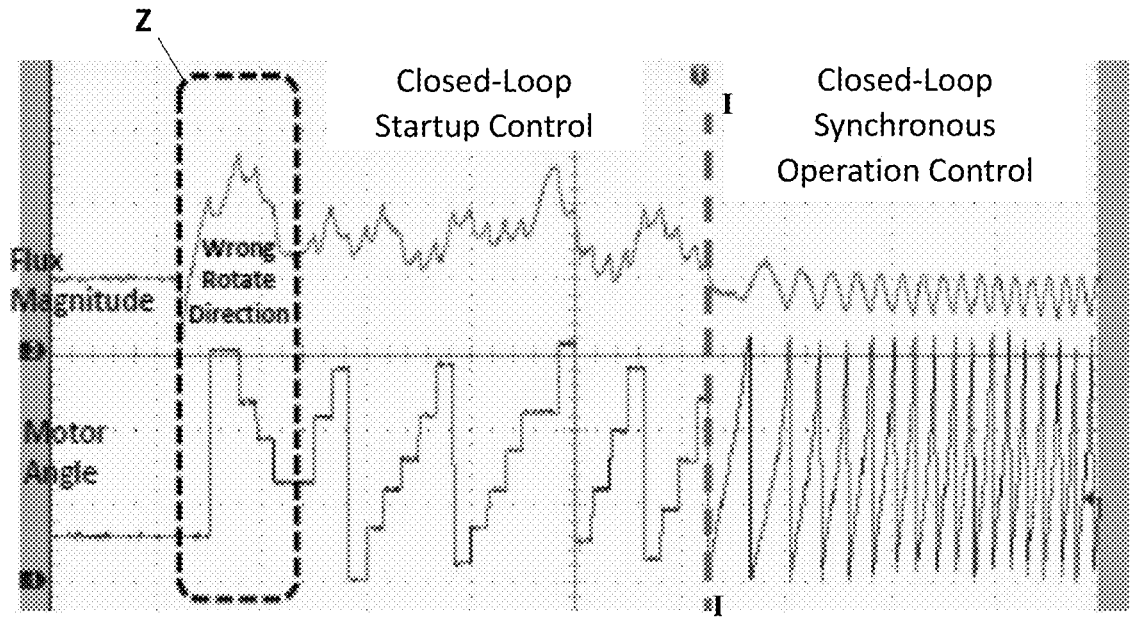
FIG. 7 is a graph illustrating the closed-loop start-up method in accordance with the invention where the rotor initially rotates in a wrong direction.

FIG. 7 provides a graph illustrating the closed-loop start-up method in accordance with the invention where the rotor initially rotates in a wrong direction as indicated by the dashed line box "Z" in the drawing. This may occur where the detected, estimated or randomly selected initial standstill rotor angle is more than 180° from the actual rotor angle. It is an inherent feature of the closed-loop start-up procedure of the invention that it will, in time, correct the direction of rotation of the rotor 12. However, the closed-loop controller 100/200 may be further configured to determine a wrong direction of rotation of the rotor 12 and to implement a correction of the direction of rotation more quickly than the correction inherent in the closed-loop start-up procedure. After the rotation of the rotor 12 has been corrected by the closed-loop controller 100/200 or corrects itself within the implementation of the closed-loop start-up procedure, the remaining part of the graph of FIG. 7 to the right of the dashed line box Z follows the graph of FIG. 5 showing successful transition from the closed-loop start-up procedure to the closed-loop synchronous operation motor control algorithm.

Figure 8:
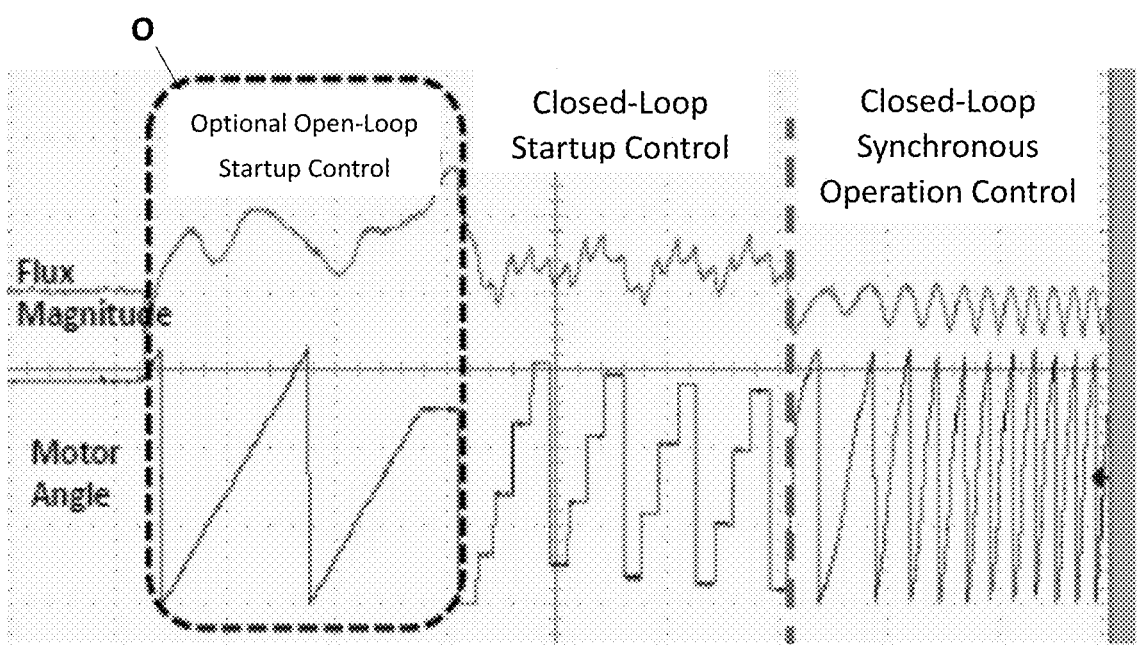
FIG. 8 is a graph illustrating the closed-loop start-up method in accordance with the invention where the closed-loop start-up method transitions from a preceding known open-loop start-up method.

FIG. 8 is a graph illustrating the closed-loop start-up method in accordance with the invention where the closed-loop start-up method transitions from a preceding known open-loop start-up method denoted by the dashed line box "O" in the drawing. The use of the open-loop start-up method for a preliminary period addresses the problem of the rotor rotating in a wrong direction on initiation of the closed-loop start-up procedure. This solution is most useful with a closed-loop controller 100/200 using a randomly selected initial standstill rotor angle on closed-loop start-up which increases the likelihood of a wrong direction of rotation of the rotor 12. Whilst it is possible under the open-loop start-up method for the rotor to initially rotate in a wrong direction, the open-loop start-up method is such that self-correction of the direction of rotation occurs within a short time of initiation of start-up. Consequently, the open-loop start-up method is employed to ensure that the rotor 12 is rotating in a correct direction before the closed-loop start-up procedure is initiated. The closed-loop controller 100/200 may be configured to detect or determine when, under the open-loop start-up method, that the rotor 12 is rotating in a correct direction and, when such determination is made, to immediately transition from the open-loop start-up method to the closed-loop start-up method of the invention.

Whilst FIGS. 5-8 show the transitions from the closed-loop start-up procedure to the closed-loop synchronous operation motor control algorithm based on expiry of a predetermined period of time, it will be understood that said transitions can be controlled in accordance with one or more of the various transition conditions hereinbefore described.

As mentioned above, the module 140 may comprise a rotor flux observer module 150 of a type as described in pages 1-3 of the publication entitled "Improved Rotor Flux Observer For Sensorless Control of PMSM With Adaptive Harmonic Elimination and Phase Compensation".

Figure 9:
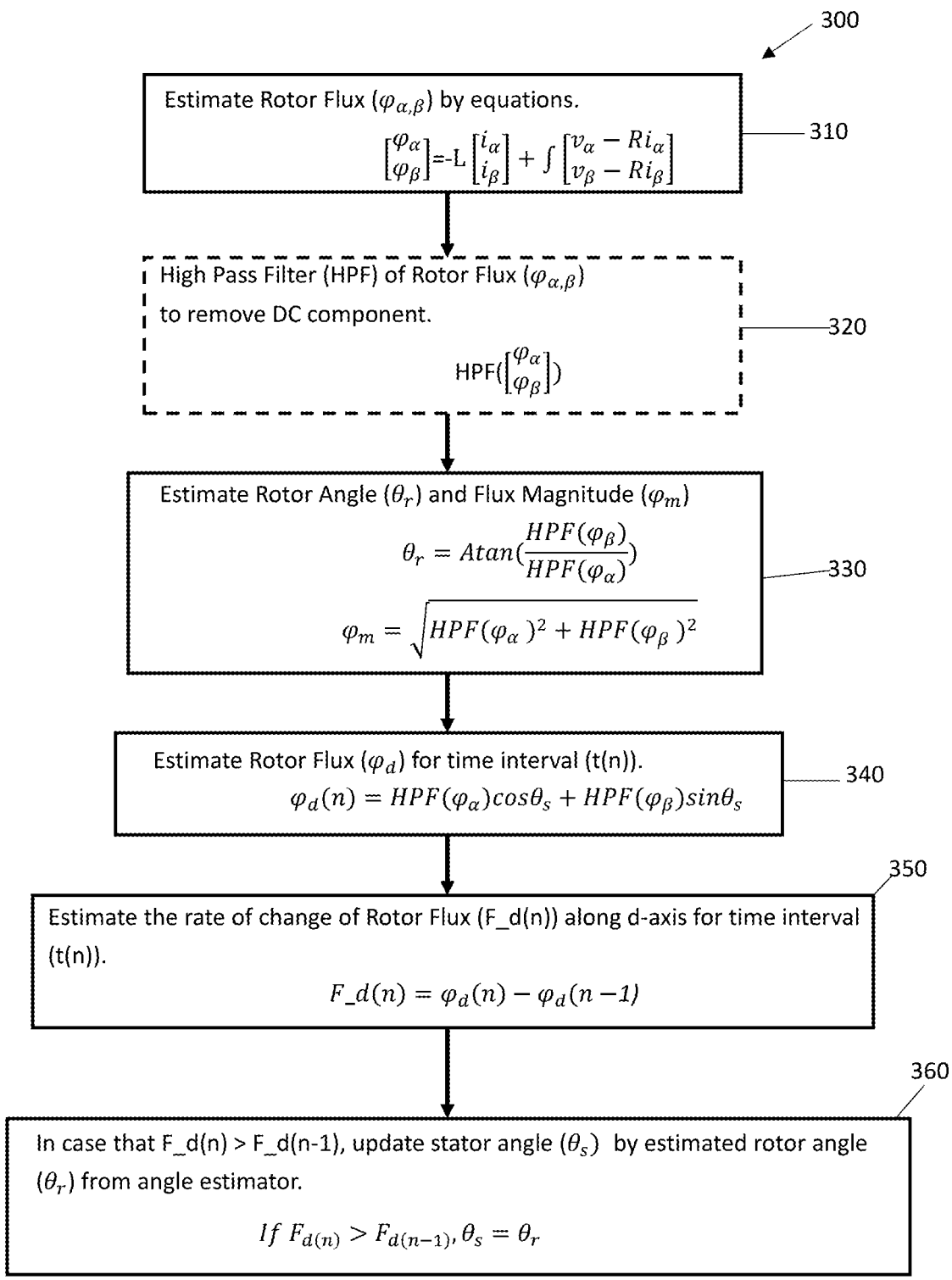
FIG. 9 is a flow chart of a method implemented by a rotor flux observer module for estimating rotor angles in accordance with the invention.

The rotor flux observer module 150 primarily acts as a rotor angle estimator. FIG. 9 is a flow chart of a method 300 implemented by the rotor flux observer module 150 for estimating new respective rotor angles for the closed-loop start-up method of the invention.

In embodiments of the invention employing the rotor flux observer module 150, the closed-loop start-up method or procedure comprises estimating respective new rotor angles based on a rate of change of the periodically estimated values of rotor flux linkage magnitude. The determination of the rate of change of the periodically estimated values of rotor flux linkage magnitude can be conducted at the respective periodic time points or intervals during the start-up method.

FIG. 9 is a flow chart of a method 300 implemented by the rotor flux observer module 150 for estimating rotor angles during at least the closed-loop start-up method in accordance with the invention. In the flow chart of FIG. 9:

$\phi_{\alpha,\beta}$ is the rotor flux in the $\alpha$ and $\beta$ axes;
$i_{\alpha,\beta}$ is the stator current in the $\alpha$ and $\beta$ axes;
$v_{\alpha,\beta}$ is the stator voltage in the $\alpha$ and $\beta$ axes;
L is the stator Inductance; and
R is the stator resistance.

Vector control of a synchronous motor can be summarized as follows:

(i) The 3-phase stator currents are measured. These measurements typically provide values for $i_a$ and $i_b$. $i_c$ is calculated because $i_a$, $i_b$ and $i_c$ have the following relationship:

$$i_a + i_b + i_c = 0.$$

(ii) The 3-phase currents are converted to a two-axis system. This conversion provides the variables $i_\alpha$ and $i_\beta$ from the measured $i_a$ and $i_b$ and the calculated $i_c$ values. $i_\alpha$ and $i_\beta$ are time-varying quadrature current values as viewed from the perspective of the stator, i.e., a two-dimensional stationary orthogonal reference frame or coordinate system.

(iii) The two-axis coordinate system is rotated to align with the rotor flux using a transformation angle calculated at the last iteration of the control loop. This conversion provides the $I_d$ and $I_q$ variables from $i_\alpha$ and $i_\beta$. $I_d$ and $I_q$ are the quadrature currents transformed to the rotating coordinate system, a two-dimensional rotating orthogonal reference frame or coordinate system. For steady state conditions, $I_d$ and $I_q$ are constant.

(iv) Error signals are formed using $I_d$, $I_q$ and reference values for each.
The $I_d$ reference controls rotor magnetizing flux.
The $I_q$ reference controls the torque output of the motor.
The error signals are input to PI controllers.

The output of the controllers provide $V_d$ and $V_q$, which is a voltage vector that will be sent to the motor.

(v) A new transformation angle is estimated where $v_\alpha$, $v_\beta$, $i_\alpha$ and $i_\beta$ are the inputs. The new angle guides the FOC algorithm as to where to place the next voltage vector.

(vi) The $V_d$ and $V_q$ output values from the PI controllers are rotated back to the stationary reference frame using the new angle. This calculation provides the next quadrature voltage values $v_\alpha$ and $v_\beta$.

(vii) The $v_\alpha$ and $v_\beta$ values are transformed back to 3-phase values $v_a$, $v_b$ and $v_c$. The 3-phase voltage values are used to calculate new PWM duty cycle values that generate the desired voltage vector. The entire process of transforming, PI iteration, transforming back and generating PWM is schematically illustrated in FIG. 4.

In a first step 310 of the method 300, the rotor flux observer module 150 estimates the rotor flux linkage along the $\alpha$ and $\beta$ axes of the motor 10. In an optional step 320, the rotor flux observer module 150 may apply a high pass filter or a band pass filter to the rotor flux linkage signal to remove at least DC signal components and possibly also high frequency noise in the rotor flux linkage signal. In a next step 330 of the method 300, the rotor flux observer module 150 estimates the rotor angle and rotor flux linkage magnitude of the rotating rotor 12. This is followed by step 340 where the rotor flux observer module 150 periodically estimates values of the rotor flux linkage magnitude along the vector d axis of the motor 10 based on the back-emf induced in the stator windings 18 by the rotating rotor 12 for respective periodic time points or intervals during the closed-loop start-up method. In one implementation of step 340, at each periodic time point or interval ("Interval t(n)") stator voltage (Vq) is applied along the q-axis and then the rotor flux linkage ($\phi_d$) along the vector d axis with stator angle ($\theta_s$) is estimated or calculated by a Park transform.

In step 350, the rotor flux observer module 150 estimates the rate of change in the rotor flux linkage magnitude values with respect to the vector d axis of the motor 10 at each respective periodic time point or interval. The rate of change of rotor flux (F_d) along the vector d-axis at time interval (t(n)) is given as follows:

$$F\_d(n) = \frac{d\varphi_d}{dt} = \frac{\varphi_d(n) - \varphi_d(n-1)}{\Delta t}$$

However, by setting $\Delta t = 1$, we can further simplify the rate of change of rotor flux along the vector d-axis as follows:

$$F\_d(n) = \phi_d(n) - \phi_d(n-1)$$

In step 360, the rotor flux observer module 150 updates the stator angle by the estimated rotor angle to generate updated motor control signals. The closed-loop controller 100/200 may be configured to only generate updated motor control signals based on the periodically estimated values of rotor flux linkage magnitude when the estimated rate of change of rotor flux linkage magnitude at a subsequent time point or time interval ("Interval t(n)") is greater than the estimated rate of change of rotor flux linkage magnitude at a preceding time point or time interval ("Interval t(n−1)").

In some embodiments, the closed-loop controller 100/200 may be configured to use the simplified rate of change of rotor flux relationship along the vector d-axis to only generate updated motor control signals based on the periodically estimated values of rotor flux linkage magnitude when the estimated rotor flux linkage magnitude value at a subsequent time point or time interval ("Interval t(n)") is greater than the estimated rotor flux linkage magnitude value at a preceding time point or time interval ("Interval t(n−1)").

The closed-loop start-up method according to the invention can be utilized in synchronous motors 10 with various stator winding configurations as illustrated by FIGS. 10-15.

Figure 10:
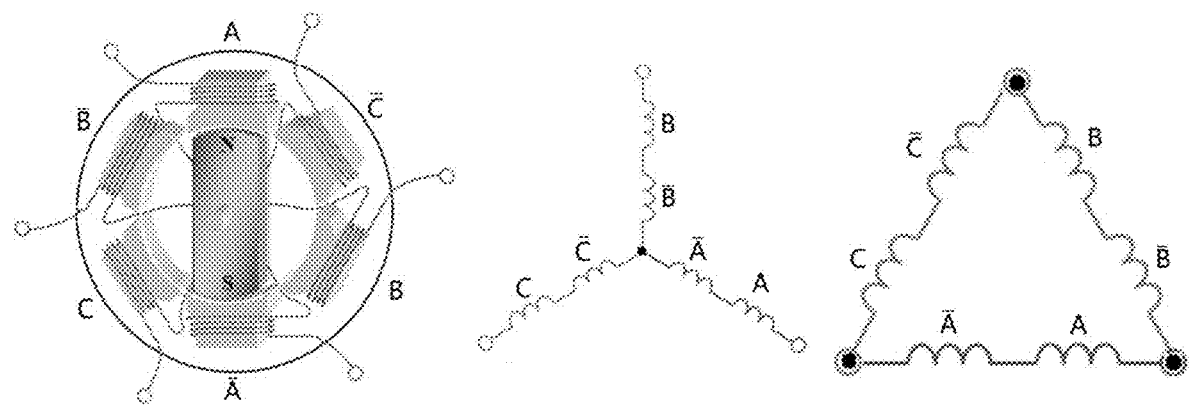
FIG. 10 is a schematic diagram showing the delta and star (or Y) stator windings configurations of a synchronous motor in which the closed-loop start-up method in accordance with the invention can be implemented.
Figure 11:
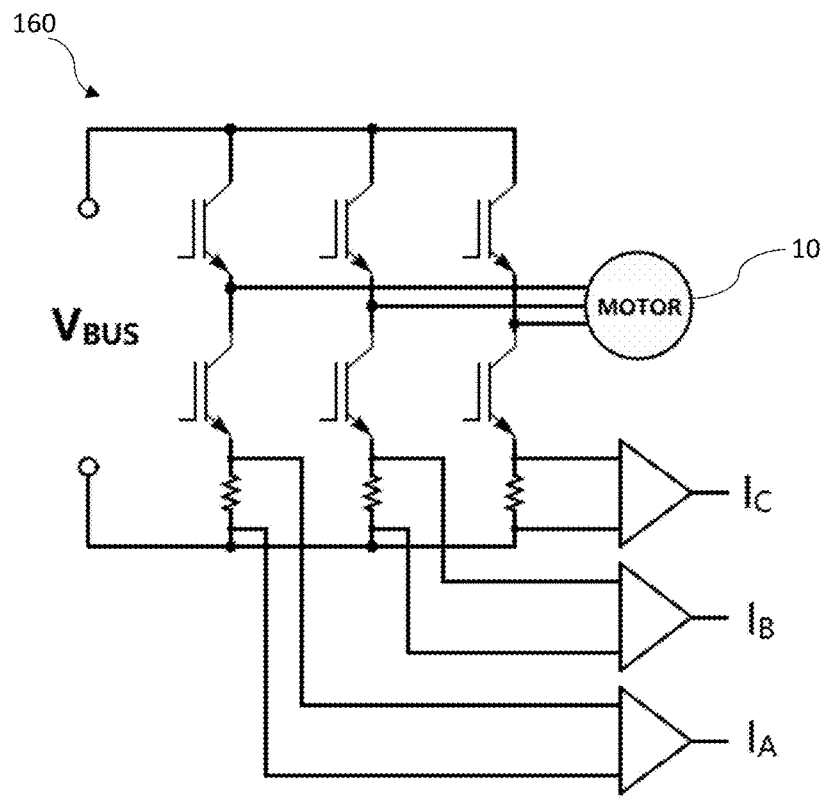
FIG. 11 is a schematic block diagram of a power stage for the closed-loop motor control system in accordance with the invention for the synchronous motor of FIG. 10.

FIG. 10 is a schematic diagram showing the conventional delta and star (or Y) stator windings configurations of the synchronous motor 10 whilst FIG. 11 provides a schematic block diagram of a 3-phase power stage/bridge 160 for the closed-loop controller 100/200 for the synchronous motor 10 of FIG. 11. Two or more of the outputs of the 3-phase bridge module 160 of the closed-loop controller 100/200 of FIG. 4 comprising two or more of the sensed currents denoted as "$I_A$", "$I_B$" and "$I_C$" in FIG. 11 are fed to the Clarke Transform module 170 of the closed-loop controller 100/200 for processing. Typically, the sensed currents "$I_A$", "$I_B$" are selected for the Clarke Transform module 170.

Figure 12:
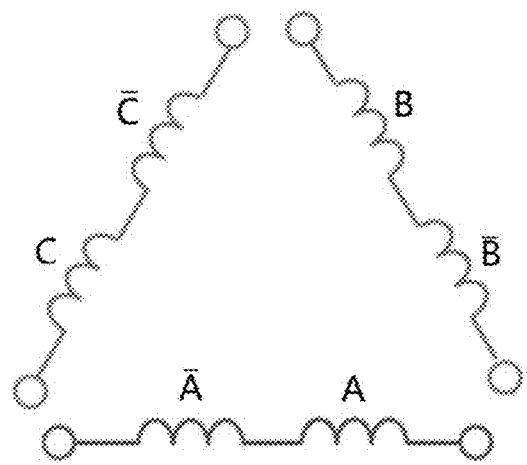
FIG. 12 is a schematic diagram showing a six-wire configuration of stator windings of a synchronous motor in which the closed-loop start-up method in accordance with the invention can be implemented.
Figure 13:
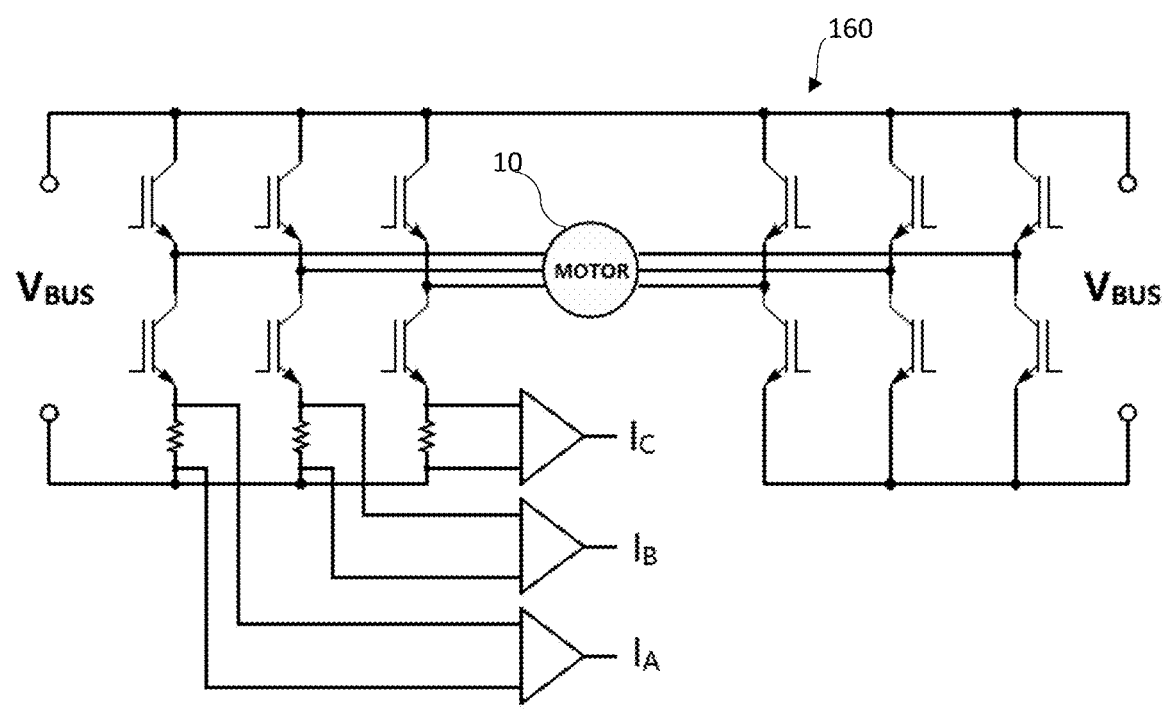
FIG. 13 is a schematic block diagram of a power stage for the closed-loop motor control system in accordance with the invention for the synchronous motor of FIG. 12.

In contrast to FIG. 10, FIG. 12 provides a schematic diagram showing a six-wire configuration of the stator windings 18 of the synchronous motor 10 whilst FIG. 13 provides a schematic block diagram of a 3-phase power stage/bridge 160 for the closed-loop controller 100/200 for the synchronous motor 10 with this stator winding configuration. The six-wire stator winding configuration results from none of the three stator windings 18 having any common connection points in contrast to the conventional delta or star stator winding configurations of FIG. 10 which have at least one common connection point between at least two of the stator windings 18.

Figure 15:
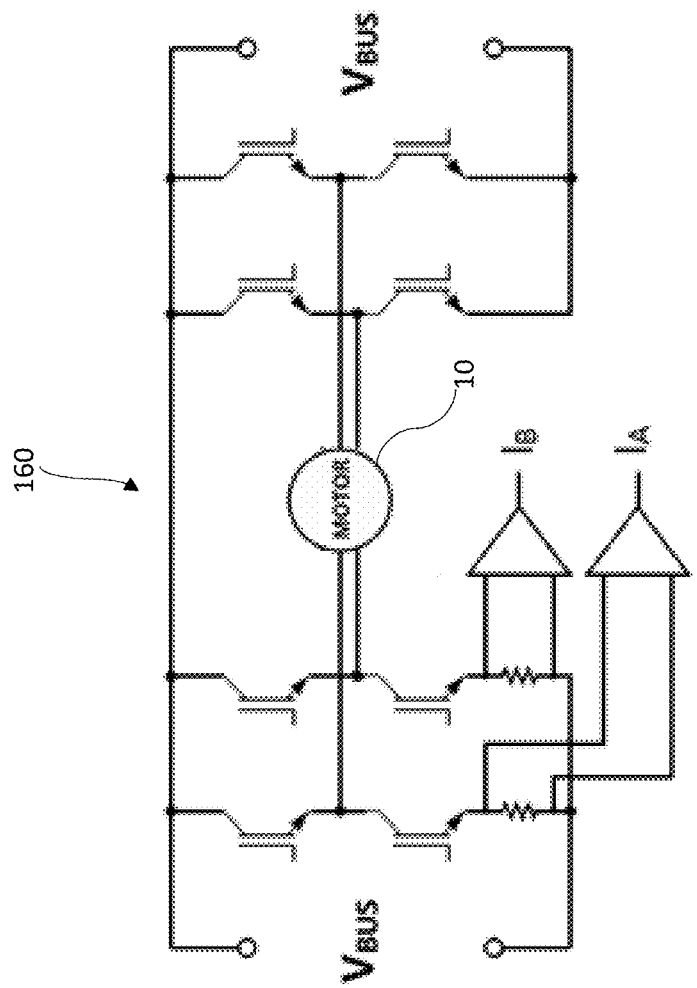
FIG. 15 is a schematic block diagram of a power stage for the closed-loop motor control system in accordance with the invention for the synchronous motor of FIG. 14.
Figure 14:
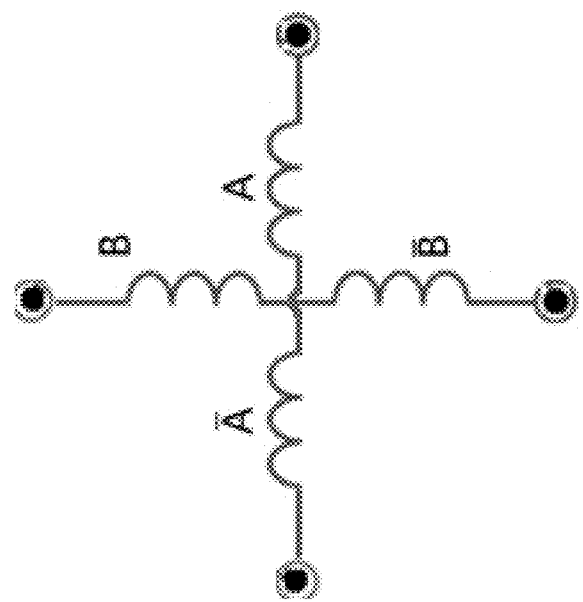
FIG. 14 is a schematic diagram showing a four-wire configuration of stator windings of a synchronous motor in which the closed-loop start-up method in accordance with the invention can be implemented.

FIG. 14 provides a schematic diagram showing a four-wire configuration of 2-phase stator windings 18 of the synchronous motor 10 in which the closed-loop start-up method in accordance with the invention can be implemented. FIG. 15 provides a schematic block diagram of a power stage/bridge 160 for the closed-loop motor controller 100/200 in which the sensed currents "$I_A$", "$I_B$" are fed into the Clarke Transform module.

The closed-loop start-up method of the invention is based on the principle that, assuming that stator voltage Vq is applied to the synchronous motor 10 along its q axis with the stator angle ($\theta_s$) and with the actual rotor angle being ($\theta_r$), then the rotor flux ($\phi_d$) along the vector d axis would be given by: $\phi_d = \phi_m \cos(\theta_r - \theta_s)$ as illustrated in FIG. 16.

To simplify calculation of the estimated values, it is assumed that $\phi_m = 1$ which results in: $\phi_d = \cos(\theta_r - \theta_s)$. The rate of change of rotor flux linkage ($d\phi_d/dt$) along the vector d axis would be $d\phi_d/dt = \sin(\theta_r - \theta_s) d\theta_r/dt$. Therefore:

at $\theta_r = \theta_s, d\phi_d/dt = 0$;

at $\theta_r = \theta_s + 90°, d\phi_d/dt = -d\phi_r/dt$;

at $\theta_r = \theta_s + 180°, d\phi_d/dt = 0$;

at $\theta_r = \theta_s + 270°, d\phi_d/dt = +d\phi_r/dt$.

Clockwise Rotor Rotation as Shown in FIG. 17

Let $\theta_{rd}$ and $\theta_{sd}$ be the rotor and stator angles with respect to the synchronous motor vector d axis.

Let $d\theta_{rd}/dt = k$, where k is a constant.

Hence $-k \leq d\phi_d/dt \leq k$.

In the closed-loop start-up method of the invention, we set $\theta_s = \theta_r$ if $d\phi_d(n)/dt > d\phi_d(n-1)/dt$.

Referring to FIGS. 17-18, we can see that (i) in quadrants 2 and 3, $\theta_s$ updates to $\theta_r$ immediately, whereas, in quadrants 1 and 4, $\theta_s$ updates to $\theta_r$ until the rotor rotates with $\theta_{rd} = 90°$. Assuming that the angle estimator module 140 comprising the rotor flux observer module 150 is operating accurately, the new estimated angle with reference to the vector axis d is $\theta_{rd} = 90°$. Hence $\theta_{sd}$ will be updated to 90° and $\theta_{rd}$ will be reset to 0°. This process is repeated periodically during the closed-loop start-up method. Since the rotor is rotated in a clockwise (correct) direction in quadrant 1, the rotor is accelerating throughout the closed-loop start-up procedure. Hence, the back-emf is also increasing and this, in turn, improves the correctness of the rotor angle estimations throughout the closed-loop start-up procedure. Without loss of generality, this holds true even where k is not a constant.

Figures 19, 20:
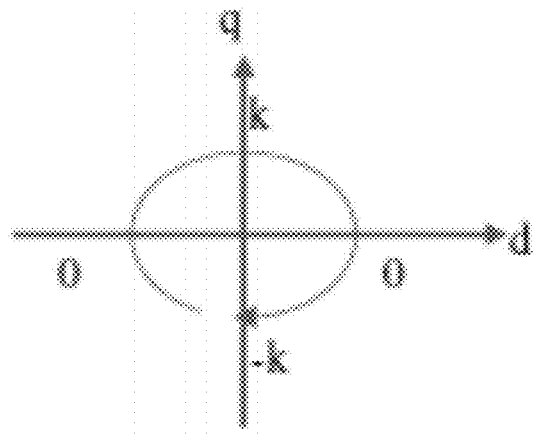
FIG. 19 illustrates anti-clockwise (incorrect) direction of rotor rotation with respect to vector axes q and d in the closed-loop start-up method in accordance with the invention.
FIG. 20 illustrates the periodic changes in rotor angle and stator angle in the closed-loop start-up method in accordance with the invention for the anti-clockwise direction of rotor rotation.

Anti-Clockwise Rotor Rotation as Shown in FIG. 19

Let $\theta_{rd}$ and $\theta_{sd}$ be the rotor and stator angle with respect to the synchronous motor vector d axis.

Let $d\theta_{rd}/dt = -k$, where k is a constant.

Hence $-k \leq d\phi_d/dt \leq k$.

In the closed-loop start-up method of the invention, we set $\theta_s = \theta_r$ if $d\phi_d(n)/dt > d\phi_d(n-1)/dt$.

Referring to FIGS. 19-20, we can see that (i) in quadrants 2 and 3, $\theta_s$ updates to $\theta_r$ immediately, whereas, in quadrants 1 and 4, $\theta_s$ updates to $\theta_r$ until the rotor rotates with $\theta_{rd} = 270°$. Assuming that the angle estimator module comprising the rotor flux observer module 150 is operating accurately, the new estimated angle with reference to the vector axis d is $\theta_{rd} = 270°$. Hence $\theta_{sd}$ will be updated to 270° and Ord will be reset to 0°. This process is repeated periodically during the closed-loop start-up method. Since the rotor is rotated in an anti-clockwise (incorrect) direction in quadrant 4, the rotor is decelerating until such time as the rotor automatically reverses its direction of rotation. Without loss of generality, this holds true even where k is not a constant.

The present invention also provides a non-transitory computer-readable medium storing machine-readable instructions, wherein, when the machine-readable instructions are executed by the processor of the closed-loop controller for the synchronous motor, they configure the processor to implement the concepts of the present invention.

The apparatus described above may be implemented at least in part in software. Those skilled in the art will appreciate that the apparatus described above may be implemented at least in part using general purpose computer equipment or using bespoke equipment.

Here, aspects of the methods and apparatuses described herein can be executed on any apparatus comprising the communication system. Program aspects of the technology can be thought of as "products" or "articles of manufacture" typically in the form of executable code and/or associated data that is carried on or embodied in a type of machine-readable medium. "Storage" type media include any or all of the memory of the mobile stations, computers, processors or the like, or associated modules thereof, such as various semiconductor memories, tape drives, disk drives, and the like, which may provide storage at any time for the software programming. All or portions of the software may at times be communicated through the Internet or various other telecommunications networks. Such communications, for example, may enable loading of the software from one computer or processor into another computer or processor. Thus, another type of media that may bear the software elements includes optical, electrical, and electromagnetic waves, such as used across physical interfaces between local devices, through wired and optical landline networks and over various air-links. The physical elements that carry such waves, such as wired or wireless links, optical links, or the like, also may be considered as media bearing the software. As used herein, unless restricted to tangible non-transitory "storage" media, terms such as computer or machine "readable medium" refer to any medium that participates in providing instructions to a processor for execution.

While the invention has been illustrated and described in detail in the drawings and foregoing description, the same is to be considered as illustrative and not restrictive in character, it being understood that only exemplary embodiments have been shown and described and do not limit the scope of the invention in any manner. It can be appreciated that any of the features described herein may be used with any embodiment. The illustrative embodiments are not exclusive of each other or of other embodiments not recited herein. Accordingly, the invention also provides embodiments that comprise combinations of one or more of the illustrative embodiments described above. Modifications and variations of the invention as herein set forth can be made without departing from the spirit and scope thereof, and, therefore, only such limitations should be imposed as are indicated by the appended claims.

In the claims which follow and in the preceding description of the invention, except where the context requires otherwise due to express language or necessary implication, the word "comprise" or variations such as "comprises" or "comprising" is used in an inclusive sense, i.e., to specify the presence of the stated features but not to preclude the presence or addition of further features in various embodiments of the invention.

It is to be understood that, if any prior art publication is referred to herein, such reference does not constitute an admission that the publication forms a part of the common general knowledge in the art.

The invention claimed is:

1. A method of switching from a closed-loop start-up method to a closed-loop synchronous operation motor control algorithm for a synchronous motor having a permanent magnet rotor and stator windings, the method comprising the steps of:
    initiating the closed-loop start-up method by energizing the stator windings to drive the permanent magnet rotor using motor control signals based on a detected, estimated, or randomly selected initial standstill angle of the permanent magnet rotor;
    estimating rate of change values of rotor flux linkage magnitude with respect to a selected vector axis of a two-dimensional rotating orthogonal reference frame of the synchronous motor based on back-electromotive force (emf) induced in the stator windings by rotation of the permanent magnet rotor; and
    switching-over control of the synchronous motor to the closed-loop synchronous operation motor control algorithm upon determining that one of the rate of change values of the rotor flux linkage magnitude has met a predetermined condition.

2. The method of claim 1, wherein determining that one of the rate of change values of the rotor flux linkage magnitude has met a predetermined condition comprises:
    determining whether a rate of change value of the rotor flux linkage magnitude at a respective time point or time interval is greater than a rate of change value of the rotor flux linkage magnitude at a preceding time point or time interval; and
    switching over control of the synchronous motor to the closed-loop synchronous operation motor control algorithm upon determining that the rate of change value of the rotor flux linkage magnitude at the respective time point or time interval is greater than the rate of change value of the rotor flux linkage magnitude at the preceding time point or time interval.

3. The method of claim 1, further comprising estimating respective new rotor angles based on the rate of change values of the rotor flux linkage magnitude.

4. The method of claim 1, further comprising:
    estimating values of rotor flux linkage magnitude based on the back-emf induced in the stator windings by the permanent magnet rotor; and
    using the values of rotor flux linkage magnitude to estimate respective new rotor angles to generate updated motor control signals to drive the permanent magnet rotor.

5. The method of claim 4, further comprising only generating updated motor control signals based on the values of the rotor flux linkage magnitude when a rotor flux linkage magnitude value at a subsequent time point or time interval is greater than a rotor flux linkage magnitude value at a preceding time point or time interval.

6. The method of claim 4, wherein estimating respective new rotor angles is performed by one of: a closed-loop synchronous operation motor control algorithm controller, a vector control algorithm controller, or a field oriented control algorithm controller.

7. The method of claim 4, further comprising one of (i) applying a high pass filter to a signal comprising the values of rotor flux linkage magnitude to remove direct current (DC) components from the signal, or (ii) applying a band pass filter to a signal comprising the values of rotor flux linkage magnitude to remove direct current (DC) components and high frequency noise from the signal.

8. The method of claim 1, wherein switching over control of the synchronous motor to the closed-loop synchronous operation motor control algorithm upon determining that one of the rate of change values of the rotor flux linkage magnitude has met a predetermined condition includes determining that the permanent magnet rotor has reached a minimum operating speed for synchronous operation.

9. The method of claim 1, wherein, after switching-over control of the synchronous motor to the closed-loop synchronous operation motor control algorithm, determining whether the synchronous motor is operating synchronously, wherein, when the synchronous motor is not operating synchronously, repeating the closed-loop start up method to retry switching-over from the closed-loop start-up method to the closed-loop synchronous operation motor control algorithm.

10. The method of claim 9, wherein repeating the closed-loop start up method does not require the permanent magnet rotor to be brought to a standstill prior to repeating the closed-loop start up method.

11. The method of claim 9, wherein it is determined that the synchronous motor is not operating synchronously when an estimated value of the rotor flux linkage magnitude at or just after a time of switching-over to the closed-loop synchronous operation motor control algorithm is determined to be below a predetermined, selected, or calculated threshold value or it is determined that a speed of the permanent magnet rotor is below a minimum operating speed for closed-loop synchronous operation motor control.

12. The method of claim 9, wherein it is determined that the synchronous motor is not operating synchronously when an estimated value of the rotor flux linkage magnitude at or just after a time of switching-over to the closed-loop synchronous operation motor control algorithm is determined to be outside a predetermined, selected, or calculated range of values.

13. The method of claim 1, further comprising:
determining from the back-emf induced in the stator windings that the permanent magnet rotor is rotating in a wrong direction; and
correcting a direction of rotation of the rotor.

14. The method of claim 1, further comprising:
prior to initiating the closed-loop start-up method, initiating start-up of the synchronous motor using an open-loop start up procedure to initiate rotation of the permanent magnet rotor from an initial standstill position.

15. The method of claim 1, further comprising:
parking the permanent magnet rotor at a predetermined rotor angle when stopping the permanent magnet rotor after switching-over control of the synchronous motor to the closed-loop synchronous operation motor control algorithm.

16. The method of claim 15, wherein an initial standstill angle of the permanent magnet rotor on initiation of the closed-loop start-up method comprises the predetermined rotor angle at which the permanent magnet rotor was parked.

17. The method of claim 1, wherein an initial standstill angle of the permanent magnet rotor on initiation of the closed-loop start-up method comprises a predetermined parked rotor angle.

18. A closed-loop controller for a synchronous motor having a permanent magnet rotor and stator windings, the closed-loop controller comprising a non-transitory computer-readable medium storing machine-readable instructions and a processor, wherein, when the machine-readable instructions are executed by the processor, the machine-readable instructions cause the controller to start the synchronous motor by:
energizing the stator windings to drive the permanent magnet rotor using motor control signals based on a detected, estimated, or randomly selected initial standstill angle of the permanent magnet rotor;
estimating rate of change values of rotor flux linkage magnitude with respect to a selected vector axis of a two-dimensional rotating orthogonal reference frame of the synchronous motor based on back-electromotive force (emf) induced in the stator windings by rotation of the permanent magnet rotor; and
switching over control of the synchronous motor to a closed-loop synchronous operation motor control algorithm upon determining that one of the rate of change values of the rotor flux linkage magnitude has met a predetermined condition.

19. A closed-loop method of starting a synchronous motor having a permanent magnet rotor and stator windings, the method comprising:
driving the permanent magnet rotor by energizing the stator windings using motor control signals based on a detected, estimated, or randomly selected initial standstill angle of the permanent magnet rotor;
estimating rate of change values of rotor flux linkage magnitude with respect to a selected vector axis of a two-dimensional rotating orthogonal reference frame of the synchronous motor based on back-electromotive force (emf) induced in the stator windings by rotation of the permanent magnet rotor;
using the rate of change values of rotor flux linkage magnitude to estimate respective new rotor angles to generate updated motor control signals;
driving the permanent magnet rotor using the updated motor control signals; and
determining from the respective new rotor angles whether the permanent magnet rotor is rotating or whether the permanent magnet rotor is rotating in a correct direction of rotation.

20. The method of claim 19, further comprising:
determining from the respective new rotor angles whether a speed of the rotor is at or above a minimum operating speed for synchronous operation of the synchronous motor.

* * * * *

UNITED STATES PATENT AND TRADEMARK OFFICE
CERTIFICATE OF CORRECTION

| | | |
|---|---|---|
| PATENT NO. | : 12,074,541 B2 | Page 1 of 1 |
| APPLICATION NO. | : 18/236066 | |
| DATED | : August 27, 2024 | |
| INVENTOR(S) | : Kwei Chung Li | |

It is certified that error appears in the above-identified patent and that said Letters Patent is hereby corrected as shown below:

In the Specification

In Column 16, Line 25, "$\theta_{rd}=270°$. Hence $\theta_{sd}$ will be updated to 270° and Ord will be" should read -- $\theta_{rd}=270°$. Hence $\theta_{sd}$ will be updated to 270° and $\theta_{rd}$ will be --

Signed and Sealed this
Seventh Day of October, 2025

John A. Squires
*Director of the United States Patent and Trademark Office*